(12) United States Patent  
Kuriya et al.

(10) Patent No.: US 8,474,117 B2  
(45) Date of Patent: Jul. 2, 2013

(54) MACHINE TOOL

(75) Inventors: Tatsuhiko Kuriya, Sakai (JP); Tsuyoshi Fujimoto, Nara (JP); Hiroshi Kamo, Yamatokoriyama (JP); Hidehito Ota, Kizugawa (JP); Hiroki Nagahara, Nara (JP)

(73) Assignee: Mori Seiki Co., Ltd., Yamatokoriyama-shi, Nara-ken (JP)

( * ) Notice: Subject to any disclaimer, the term of this patent is extended or adjusted under 35 U.S.C. 154(b) by 501 days.

(21) Appl. No.: 12/791,255

(22) Filed: Jun. 1, 2010

(65) Prior Publication Data  
US 2010/0307300 A1    Dec. 9, 2010

(30) Foreign Application Priority Data  
Jun. 5, 2009  (JP) ................................. 2009-136133

(51) Int. Cl.  
*B23Q 7/00*      (2006.01)

(52) U.S. Cl.  
USPC ....... 29/33 P; 211/208; 211/184; 414/331.14; 414/222.07; 414/226.05

(58) Field of Classification Search  
CPC ....................................................... B23Q 7/00  
USPC ................................ 211/1.57, 207, 208, 184; 414/331.14–331.18, 216, 222.07, 226.05; 700/214, 218; 901/46, 47, 9; 29/33 P  
See application file for complete search history.

(56) References Cited

U.S. PATENT DOCUMENTS

| 570,657 | A | * | 11/1896 | Beckwith | 108/61 |
| 4,621,410 | A | * | 11/1986 | Williamson | 483/1 |
| 7,153,252 | B2 | * | 12/2006 | Luscher | 483/62 |
| 2005/0232743 | A1 | * | 10/2005 | Downs et al. | 414/741 |

FOREIGN PATENT DOCUMENTS

| GB | 2441594 A | * | 3/2008 |
| JP | 3047847 B | | 3/2000 |

* cited by examiner

*Primary Examiner* — Daniel Howell  
*Assistant Examiner* — Ryan Rufo  
(74) *Attorney, Agent, or Firm* — Smith Patent Office

(57) ABSTRACT

There is provided a machine tool capable of housing workpieces of different sizes in a same workpiece storage unit without requiring a new workpiece storage unit. In a machine tool including a workpiece storage unit having a plurality of housing spaces housing workpieces and a processing machine processing a workpiece supplied from one of the housing spaces, the workpiece storage unit is structured so that the size of each housing space is changeable.

3 Claims, 13 Drawing Sheets

MACHINE FRONT F

MACHINE FRONT F

MACHINE FRONT F

MACHINE TOOL

BACKGROUND OF THE INVENTION

1. Field of the Invention

The present invention relates to a machine tool including a processing machine processing a workpiece and a workpiece storage unit housing workpieces, and particularly relates to the sizes of workpiece housing spaces in the workpiece storage unit.

2. Description of the Related Art

As a workpiece storage unit of this type, for example, Japanese Patent No. 3047847 discloses one in which pallet storage shelves formed at plural levels in a vertical direction are arranged annularly circumferentially, and a carry arm capable of moving in the vertical direction, turning about a vertical axis, and moving in a horizontal direction is disposed in the center portion thereof.

SUMMARY OF THE INVENTION

Incidentally, in the conventional workpiece storage unit, housing spaces formed by the pallet storage shelves are fixed in size, and thus the sizes of workpieces which can be housed are fixed as well. Therefore, when workpieces of different sizes are stored, there occurs a problem of requiring a new workpiece storage unit.

It is an object of the present invention to provide a machine tool capable of housing workpieces of different sizes in a same workpiece storage unit without requiring a new workpiece storage unit.

In a machine tool according to the present invention including a workpiece storage unit having a plurality of housing spaces housing workpieces and a processing machine processing a workpiece supplied from one of the housing spaces, the workpiece storage unit is structured so that the size of each housing space is changeable.

According to the present invention, because the housing spaces of the workpiece storage unit are changeable, workpieces of different sizes can be housed in the same workpiece storage unit by changing the housing spaces in size according to the sizes of workpieces, thereby allowing to increase types of workpieces which can be housed.

In a preferred embodiment of the present invention, the workpiece storage unit has a workpiece replacement device supplying a workpiece housed in one of the housing spaces to the processing machine and housing a workpiece processed with the processing machine in one of the housing spaces, and the size of each housing space is changed using the workpiece replacement device.

According to the preferred embodiment, because the housing spaces are changed by the workpiece replacement device provided for replacing an unprocessed workpiece housed in one of the housing spaces with a processed workpiece, it is possible to change the housing spaces without providing a new housing space changing mechanism.

In another preferred embodiment of the present invention, the workpiece storage unit has a plurality of support posts extending in a vertical direction and shelves disposed at plural levels on the support posts, at least a part of the shelves is removable, and the size of each housing space is changed by the workpiece replacement device attaching/removing the removable shelves to/from the support posts or moving the attaching position thereof in an upward or downward direction.

According to another preferred embodiment, because the housing spaces are formed by disposing shelves at plural levels on the support posts, at least a part of the shelves is removable, and the housing spaces are changed by attaching/removing the removable shelf to/from the support posts or moving the shelf in an upward or downward direction using the workpiece replacement device, it is possible to change the housing spaces without complicating the structure of the entire machine.

In still another preferred embodiment of the present invention, a workpiece detecting means for detecting the size of a workpiece which is supplied to the workpiece storage unit is provided, in which the workpiece replacement device houses the supplied workpiece in a housing space having a size corresponding to the size of the workpiece detected by the workpiece detecting means.

According to still another preferred embodiment, because the workpiece detecting means for detecting the size of a workpiece which is supplied to the workpiece storage unit is provided, and the supplied workpiece is housed automatically by the workpiece replacement device in a housing space corresponding to the size of the workpiece detected by the workpiece detecting means, it is not necessary for the operator to specify the workpiece size by operating an operation board, thereby facilitating a workpiece supply operation to the workpiece storage unit.

DETAILED DESCRIPTION OF THE PREFERRED EMBODIMENTS

Figure 1:
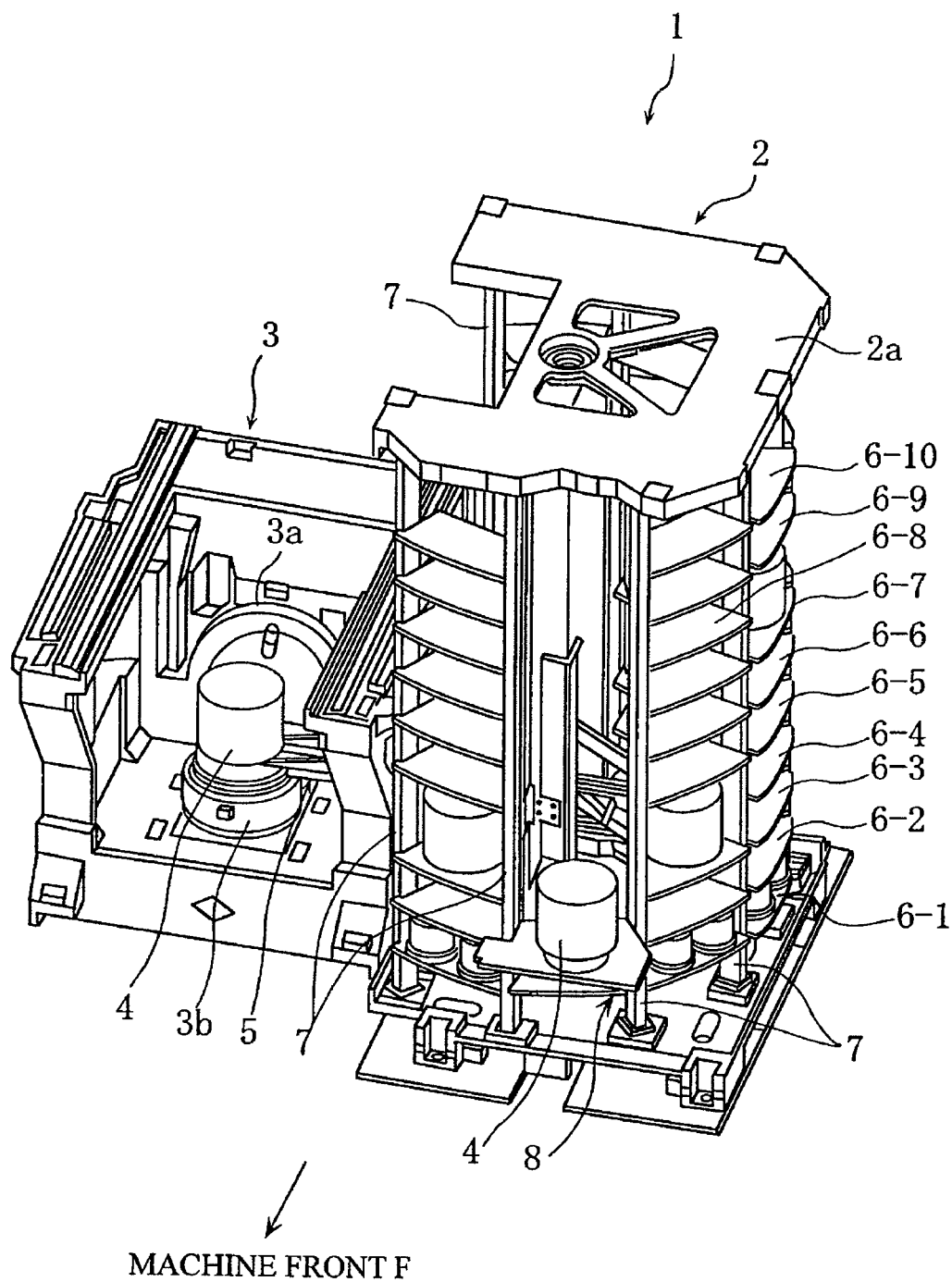
FIG. 1 is an overall perspective view of a machine tool according to an embodiment of the present invention.
Figure 2:
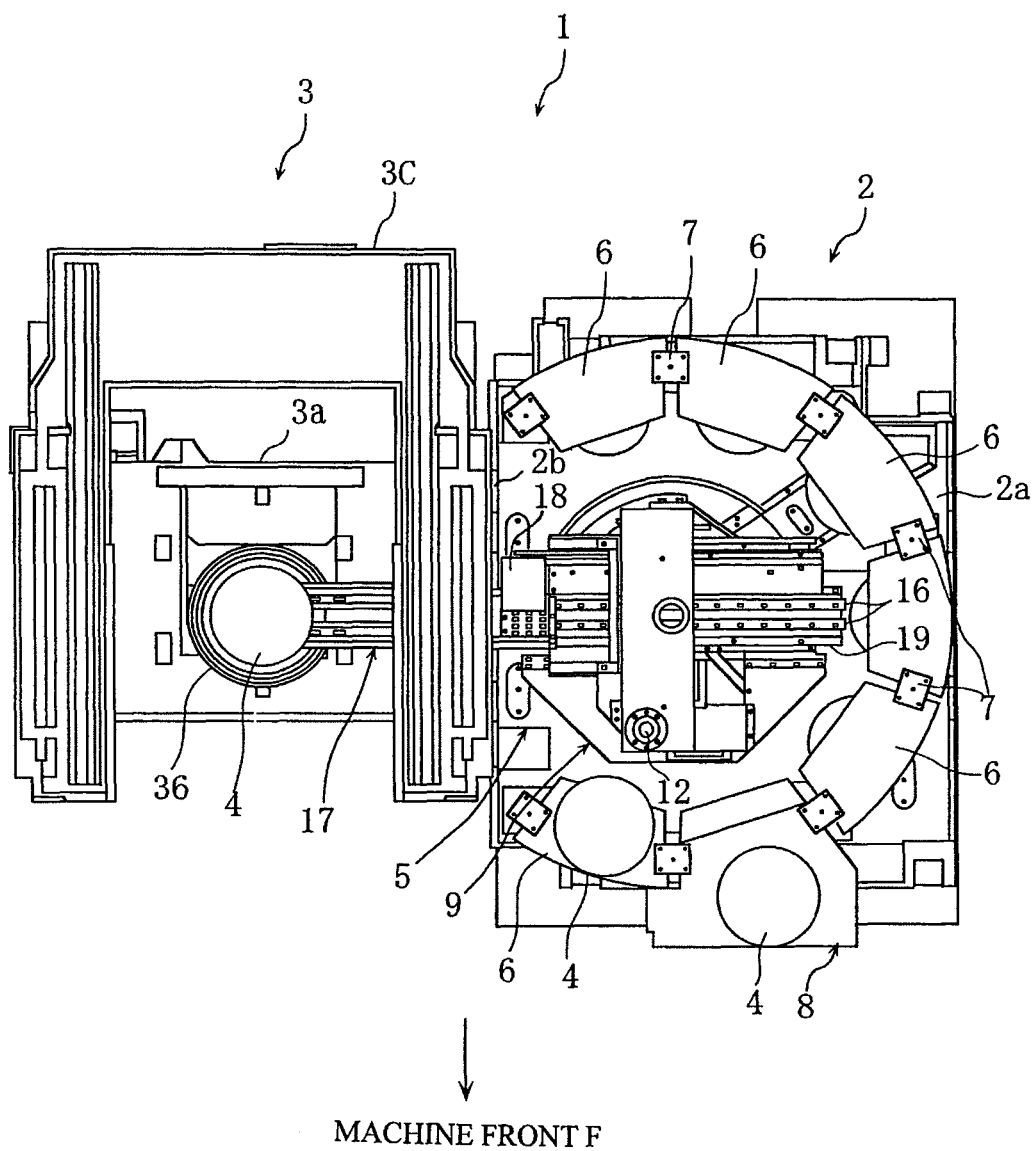
FIG. 2 is a plan view of the machine tool.
Figure 3:
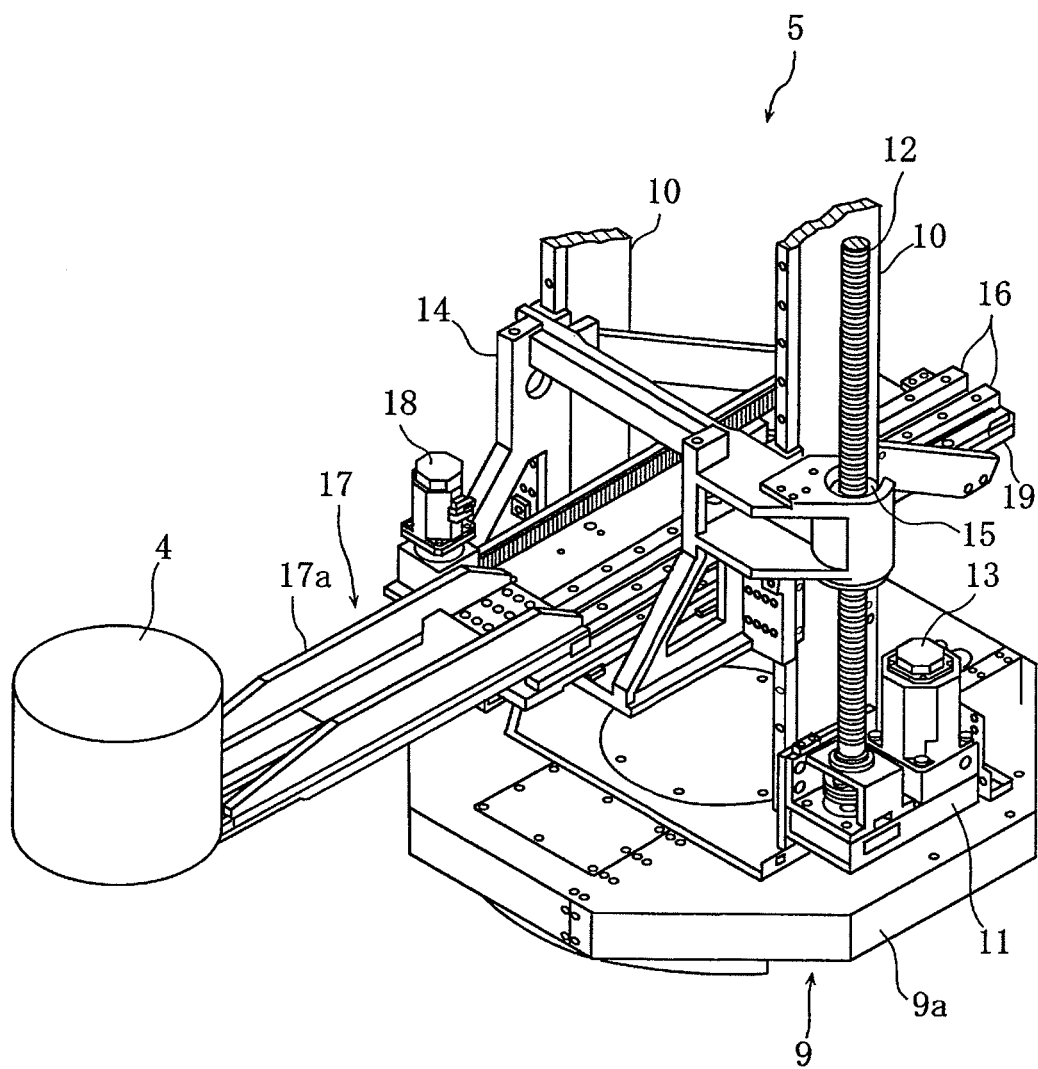
FIG. 3 is a perspective view of a workpiece replacement device of the machine tool.

Hereinafter, an embodiment of the present invention will be described based on the attached drawings.

FIG. 1 to FIG. 17 are views for describing a machine tool according to the embodiment of the present invention.

In the drawings, numeral 1 denotes a machine tool. This machine tool 1 includes a workpiece storage unit 2 storing a large number of workpieces 4, and a processing machine 3 performing machine processing on a workpiece 4 supplied from the workpiece storage unit 2.

The processing machine 3 includes a worktable 3b on which the workpiece 4 is mounted, and a processing machine body 3a which performs various types of processing on the workpiece 4 mounted on the worktable 3b. Incidentally, numeral 3c denotes a structure formed surrounding the circumference of the processing machine body 3a and the worktable 3b.

The workpiece storage unit 2 includes a storage device body 2a formed in a substantially cylindrical shape, and a workpiece replacement device 5 disposed in a center portion of the storage device body 2a. The storage device body 2a has a plurality of support posts 7 disposed annularly circumferentially and extending in a vertical direction, shelves 6-1 to 6-10 at plural levels supported between adjacent support posts 7, 7, and a preparation station 8 provided to be located at a machine front F.

The shelves 6-1, 6-3, ..., 6-9 at odd number levels out of the shelves 6-1 to 6-10 are fixed between the support posts 7, 7 via brackets 7a, and the shelves 6-2, 6-4, ..., 6-10 at even number levels are supported removably between the support posts 7, 7.

Specifically, front and rear support brackets 7b, 7c are fixed to the support posts 7. The rear support brackets 7c, 7c support left and right rear portions 6', 6' of the shelves 6-2, 6-4, ..., 6-10, and the front support brackets 7b, 7b support left and right front portions 6", 6" of the shelves 6-2, 6-4, ..., 6-10. Further, a pin hole 7d is formed in each rear support bracket 7c, in which a falling prevention pin 6a planted in the shelves 6-2, 6-4, ..., 6-10 is inserted. Moreover, a positioning projection 7e is formed to project thereon, which engages with a positioning hole 6c formed in the shelves 6-2, 6-4, ..., 6-10.

The preparation station 8 has a fixed table 8a supporting a rotary table 26, and a rotary actuator 24 is disposed below the rotary table 26 of the fixed table 8a. An output gear 24a of the rotary actuator 24 meshes with an input gear 26a of the rotary table 26. A workpiece 4 is mounted on a pallet 23 mounted on the rotary table 26, and the pallet 23 and the workpiece 4 are fastened by a bolt or the like while rotating the pallet 23 and the workpiece 4 by the rotary table 26. Incidentally, the pallet 23 and the workpiece 4 may be fastened without rotating the rotary table 26 depending on the shape or the like of the workpiece.

Further, a workpiece detecting sensor 25 detecting a workpiece size by rotating the rotary table 26 once is disposed above the fixed table 8a. This workpiece detecting sensor 25 is constituted of a CCD camera, and the size of a workpiece is detected by processing an image from this camera.

The workpiece replacement device 5 includes a workpiece replacement arm 17 structured to be capable of moving forward or backward in a horizontal direction, and a turning and lifting mechanism 9 turning the workpiece replacement arm 17 about a vertical axis and lifting and lowering the arm in the vertical direction.

The turning and lifting mechanism 9 includes a base 9a which is driven to turn about the vertical axis by a turn drive motor (not shown), a pair of lifting guide support posts 10, 10 fixed extending in the vertical direction on an upper face of the base 9a, a lift frame 14 supported in a liftable and lowerable manner by the pair of lifting guide support posts 10, 10, a ball screw shaft 12 screwed through a nut member 15 fixed to the lift frame 14, and a lift drive motor 13 disposed on the base 9a to drive the ball screw shaft 12. Incidentally, rotation of the lift drive motor 13 is transmitted to the ball screw shaft 12 via a transmission mechanism disposed inside a transmission case 11.

The workpiece replacement arm 17 has an arm support table 19 fixed and supported on the lift frame 14, and an arm body 17a supported to be movable forward and backward in the horizontal direction by the arm support table 19. A pair of left and right guide rails 16, 16 are disposed on the arm support table 19, and linear guides 16a provided on a bottom face of the arm body 17a are mounted slidably on the guide rails 16, 16. Further, a forward/backward drive motor 18 which drives the arm body 17a is fixed on the arm support table 19. A pinion gear 18a fixed on an output shaft of the forward/backward drive motor 18 meshes with a rack gear 17b fixed on a side face of the arm body 17a.

A bifurcated fork 17c supporting the pallet 23 is formed in a front end portion of the arm body 17a. Fork pins 17d to be inserted in the pin holes 6b formed in the removable shelves 6-2, 6-4, ..., 6-10 are disposed projecting upward on a base portion of the fork 17c. Further, a switch 20 for recognizing the presence of a shelf is disposed on the base portion of the fork 17c.

In the above structure, the workpiece replacement arm 17 turns about the vertical axis when the turn drive motor (not shown) drives and turns the base 9a, moves upward or downward when the lift drive motor 13 rotates the ball screw shaft 12, and further moves back in the horizontal direction when the forward/backward drive motor 18 rotates the pinion gear 18a.

First, a replacement operation for a processed workpiece 4a and an unprocessed workpiece 4b mounted in a predetermined housing space of the workpiece storage unit 2 will be described.

Figure 4:
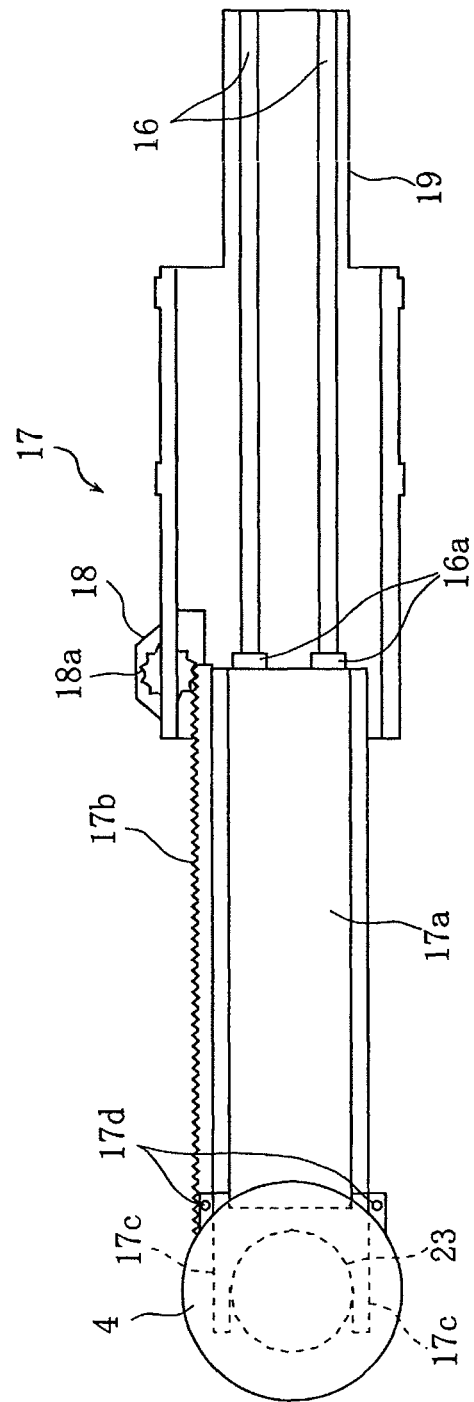
FIG. 4 is a plan view of a workpiece replacement arm when the arm is in a forward position.
Figure 5:
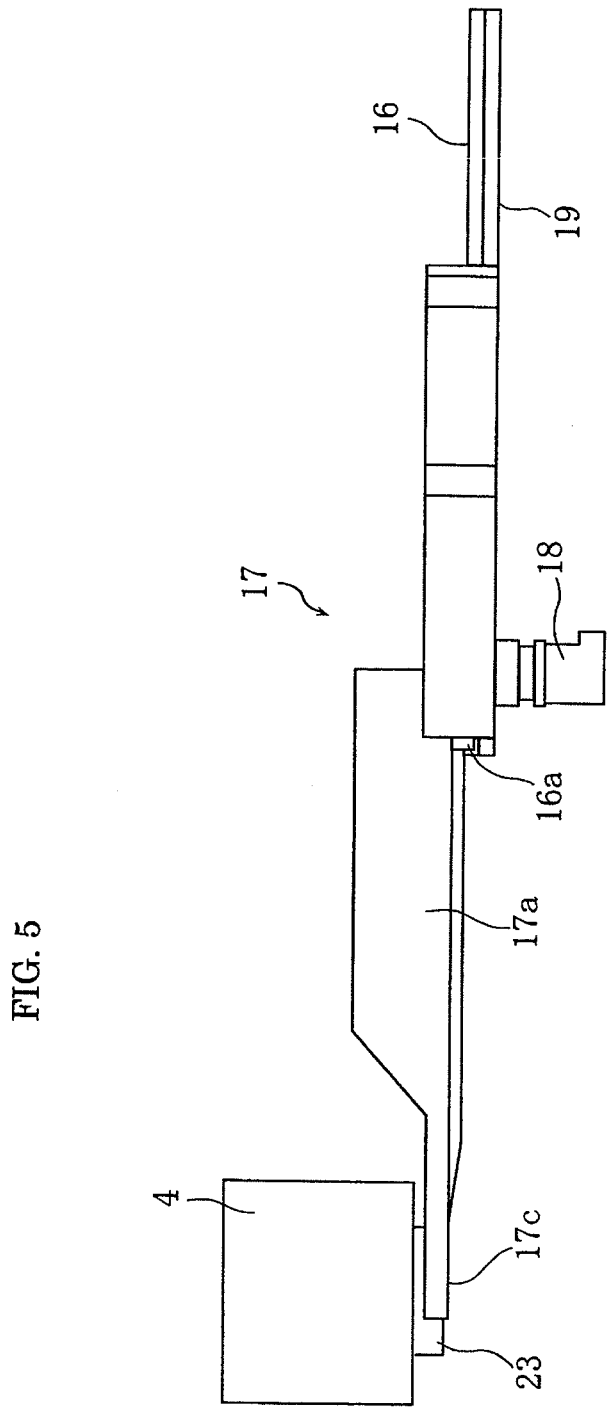
FIG. 5 is a side view of the workpiece replacement arm.
Figure 6:
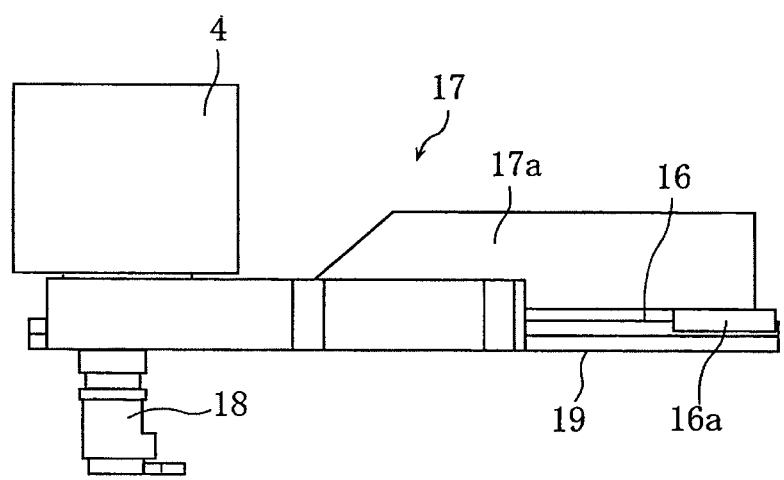
FIG. 6 is a side view of the workpiece replacement arm when the arm is in a moved back position.
Figure 7:
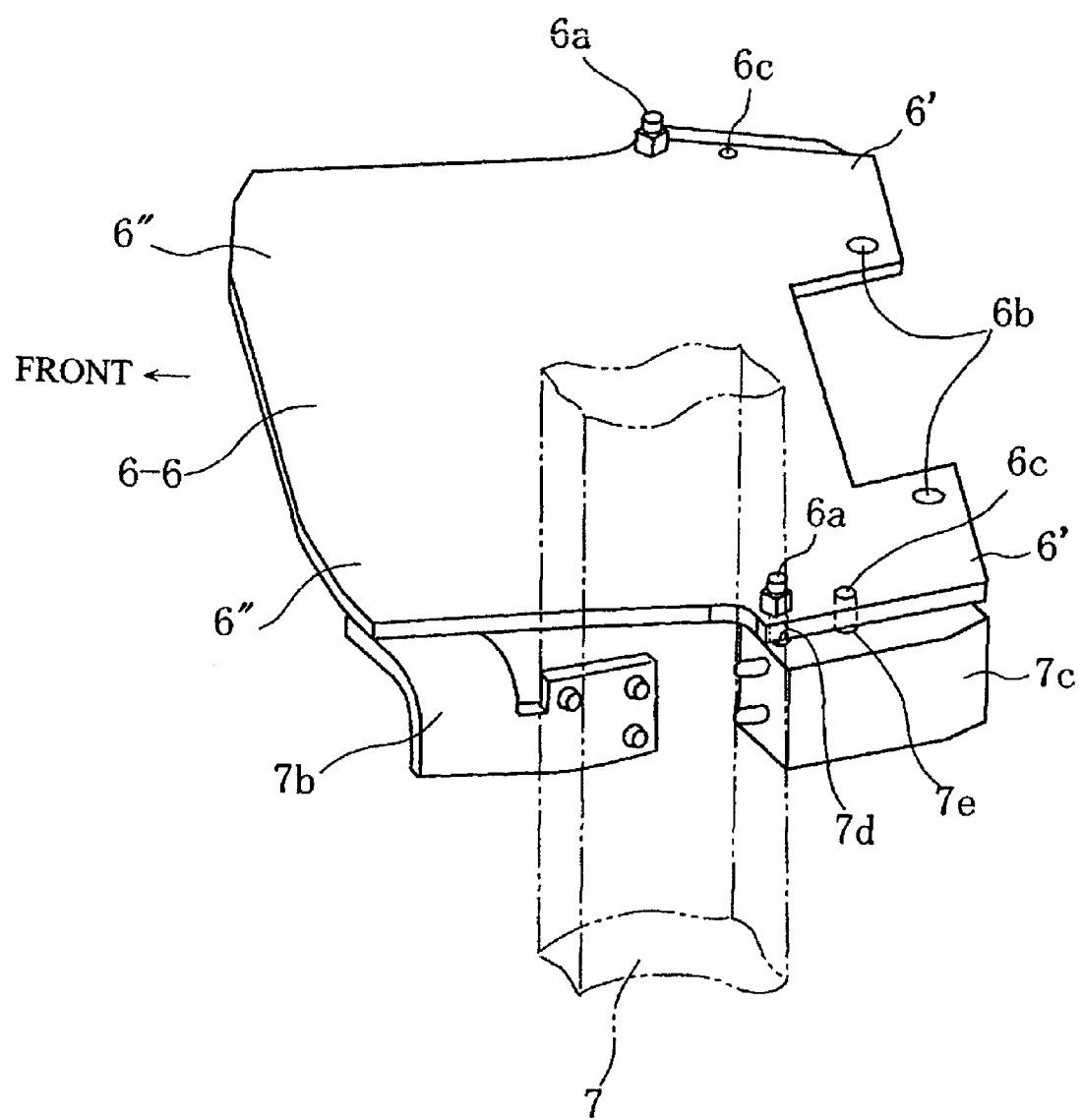
FIG. 7 is a perspective view showing the state of a removable shelf arranged on support brackets.
Figure 8:
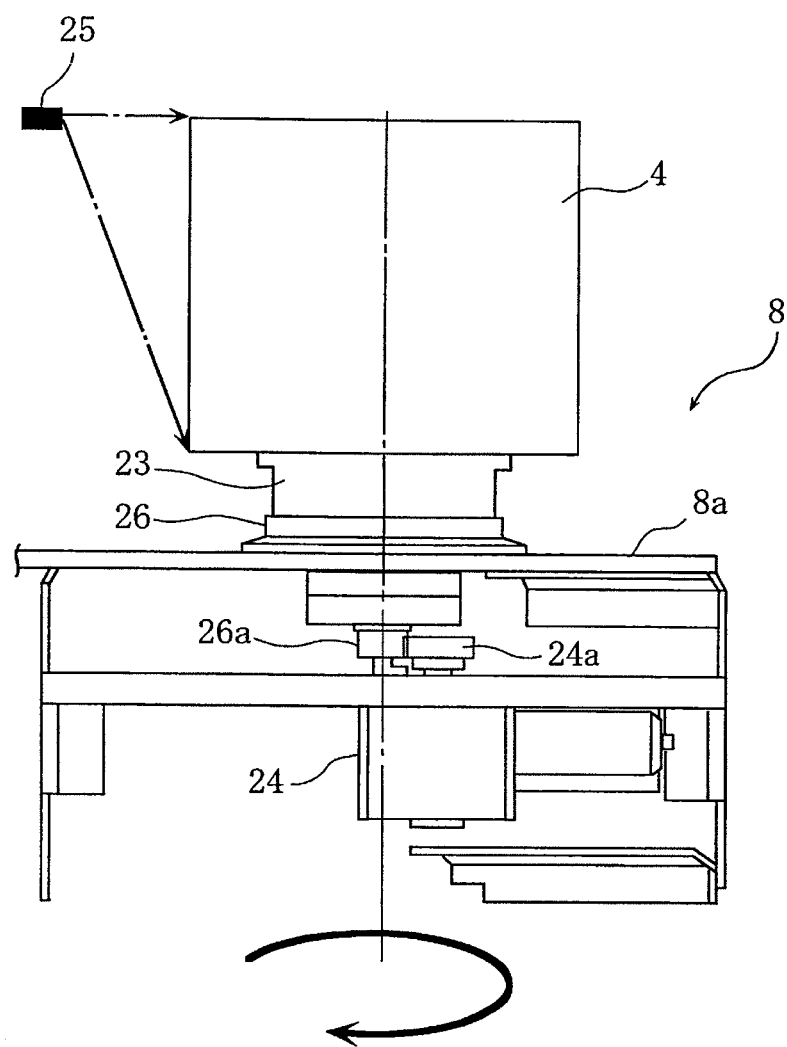
FIG. 8 is a side view of a preparation station.
Figure 9:
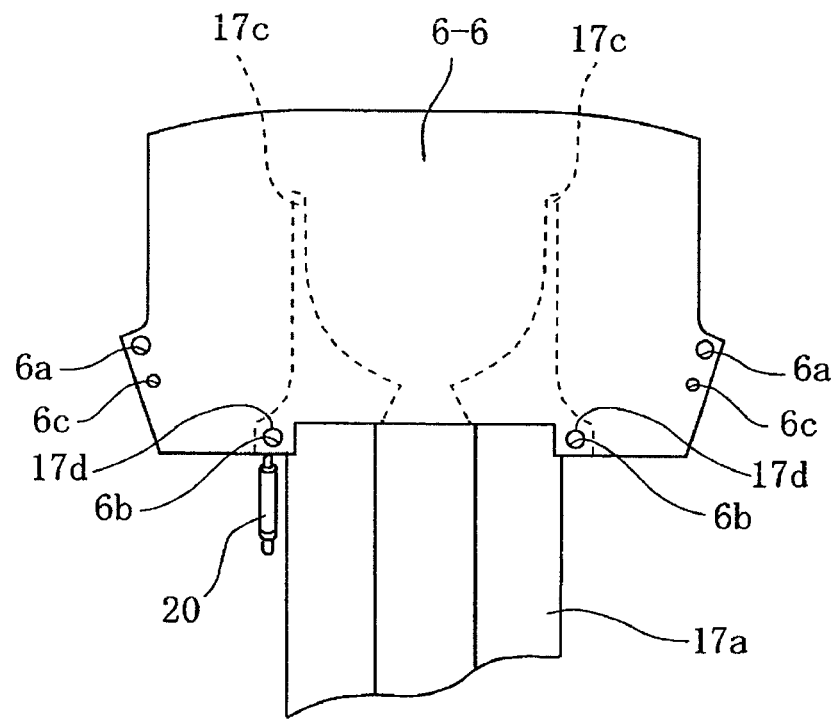
FIG. 9 is a plan view showing the state of the workpiece replacement arm and the shelf when the shelf is moved by the workpiece replacement device.
Figure 10:
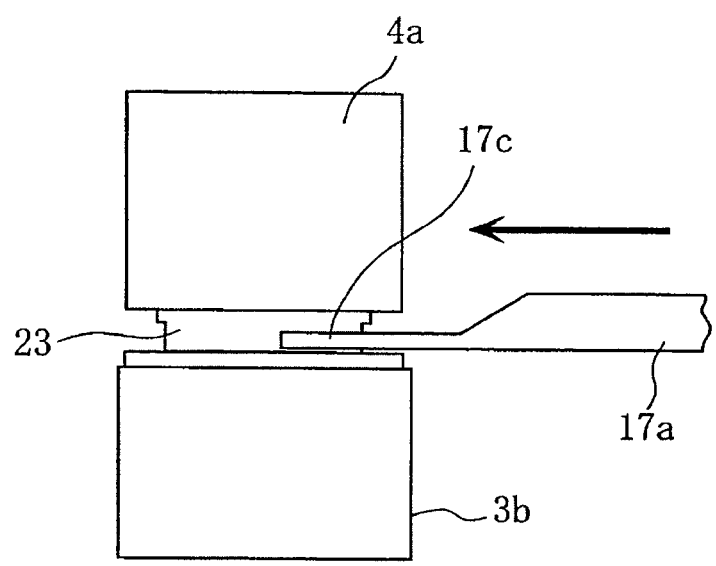
FIG. 10 is a side view showing a state that a processed workpiece is being removed from a worktable of a processing machine.
Figure 11:
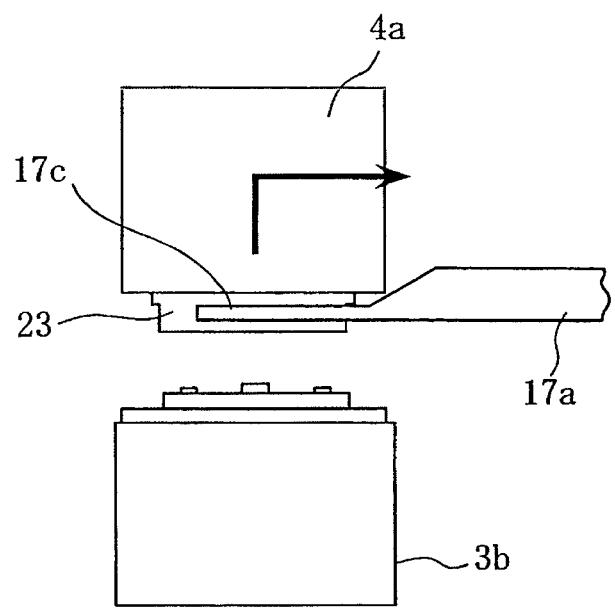
FIG. 11 is a side view showing a state that the processed workpiece is removed from the worktable.
Figure 12:
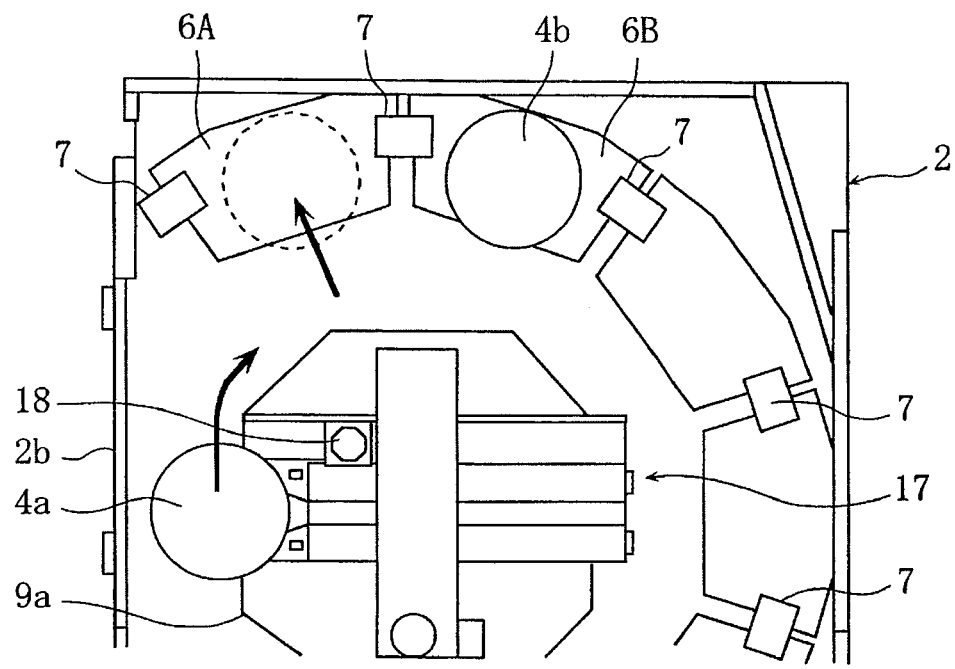
FIG. 12 is a plan view for describing an operation to house the processed workpiece on a shelf.
Figure 13:
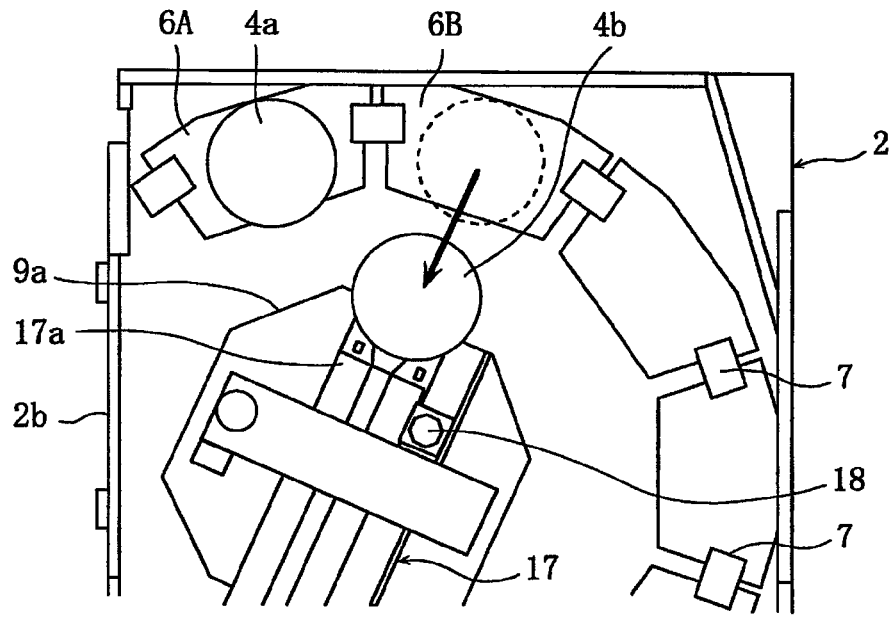
FIG. 13 is a plan view for describing an operation to take an unprocessed workpiece off a shelf.
Figure 14:
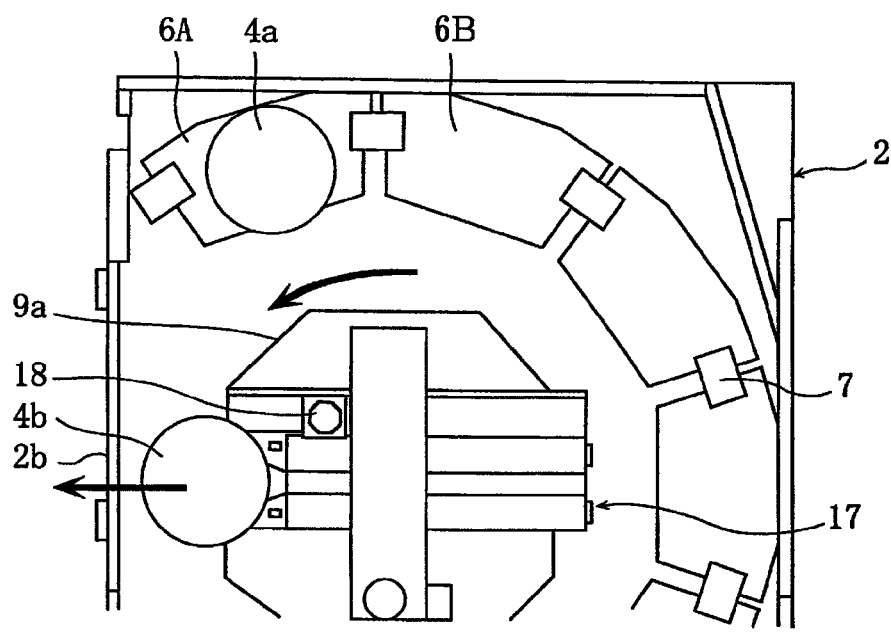
FIG. 14 is a plan view for describing an operation to supply the unprocessed workpiece to the worktable of the processing machine.
Figure 15:
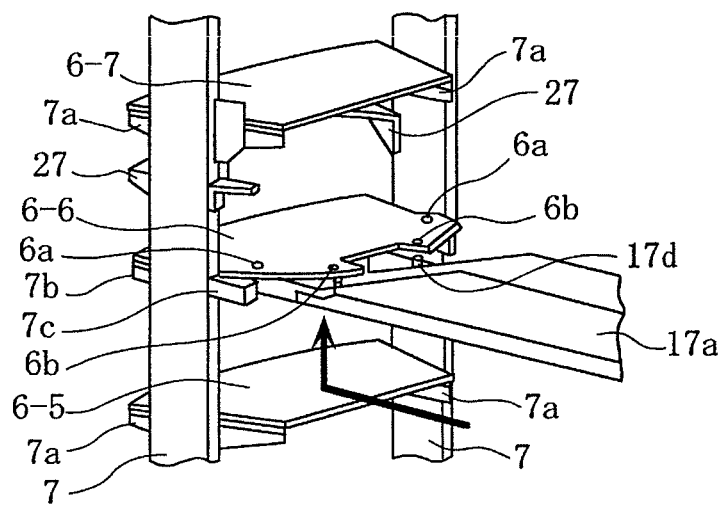
FIG. 15 is a perspective view showing a state that the removable shelf is being removed from the support brackets.

When processing the workpiece is finished, a shutter 2b arranged at a boundary between the processing machine 3 and the workpiece storage unit 2 opens, and the arm body 17a extends the fork 17c, 17c to both sides of the pallet 23 mounted on the worktable 3b of the processing machine 3 (see FIGS. 4, 5 and FIG. 10). Then the entire workpiece replacement arm 17 moves upward in the vertical direction to lift the processed workpiece 4a (see FIG. 11), and the arm body 17a moves backward, thereby moving the processed workpiece 4a from the processing machine 3 to the workpiece storage unit 2 side.

Subsequently, the turn drive motor (not shown) turns the base 9a about the vertical axis so that the workpiece replacement arm 17 is at the angle position corresponding to a shelf 6A on which the processed workpiece 4a is to be temporarily placed, and the lift drive motor 13 rotates the ball screw shaft 12 so that the workpiece replacement arm 17 is at the height position corresponding to the shelf 6A for temporary placement. The arm body 17a moves forward in the horizontal direction to the position corresponding to the shelf 6A for temporary placement, and thereafter the entire workpiece replacement arm 17 moves down in the vertical direction, thereby transferring the processed workpiece 4a onto the shelf 6A (see FIG. 12). Then the arm body 17a moves back in the horizontal direction to its original position.

Moreover, the workpiece replacement arm 17 is driven to turn about the vertical axis to be at the angle position corresponding to a shelf 6B on which the unprocessed workpiece 4b is temporarily placed. The arm body 17a extends the fork 17c, 17c to left and right sides of the pallet (not shown) fixed to the unprocessed workpiece 4b, and the entire workpiece replacement arm 17 moves upward in the vertical direction to lift the unprocessed workpiece 4b, thereby removing it from the shelf 6B (see FIG. 13). The arm body 17a moves back in the horizontal direction to its original position.

Then the workpiece replacement device 5 is driven to turn about the vertical axis to be at the angle position corresponding to the worktable 3b of the processing machine 3, the arm body 17a moves forward in the horizontal direction so that the unprocessed workpiece 4b is positioned above the worktable 3b (see FIG. 14), and the entire workpiece replacement device 5 moves downward in the vertical direction, thereby transferring the unprocessed workpiece 4b onto the worktable 3b. The arm body 17a moves backward in the horizontal direction to its original position, the shutter 2b closes, and processing is started again.

Next, an operation for enlarging a housing space in the workpiece storage unit 2 will be described, which is performed by moving, for example, the removable shelf 6-6 from the lower, front and rear support brackets 7b, 7c to an upper bracket 27.

The turn drive motor turns the base 9a about the vertical axis so that the workpiece replacement arm 17 is at the angle position corresponding to a relevant column of shelves, and the lift drive motor 13 rotates the ball screw shaft 12 so that the arm is at the height position corresponding to the shelf 6-6 for changing the housing space. Then the arm body 17a moves forward in the horizontal direction so that the fork 17c is positioned below the shelf 6-6, and subsequently the entire workpiece replacement arm 17 moves upward to engage the fork pins 17d, 17d with the pin holes 6b, 6b (see FIG. 15).

Figure 16:
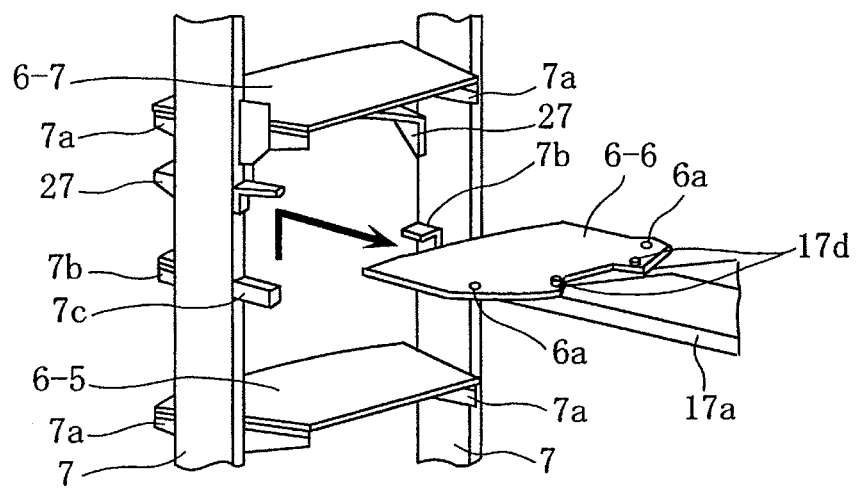
FIG. 16 is a perspective view showing a state that the removable shelf is removed from the support brackets.
Figure 17:
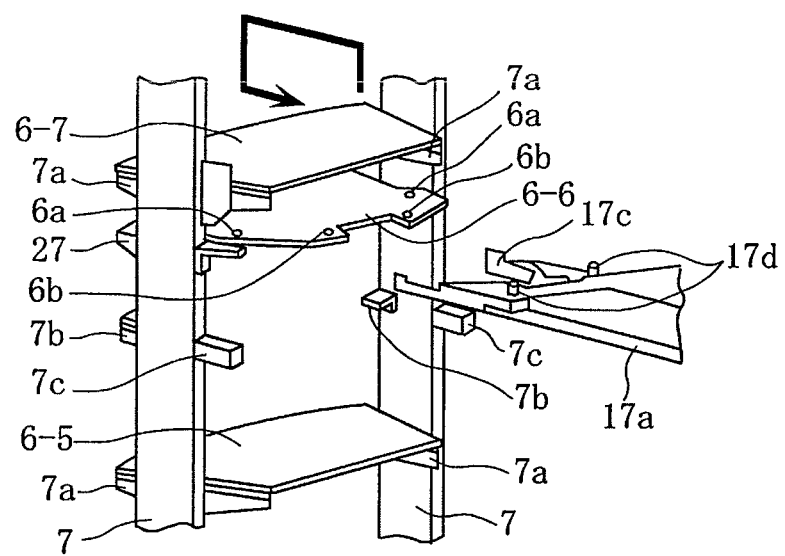
FIG. 17 is a perspective view showing a state that the removable shelf is attached to an upper bracket.

The entire workpiece replacement arm 17 moves upward further to remove the shelf 6-6 from the front and rear brackets 7b, 7c, and the arm body 17a moves back in the horizontal direction to its original position (see FIG. 16).

The lift drive motor 13 drives the workpiece replacement arm 17 to move upward to the height position corresponding to the upper bracket 27, and the arm body 17a moves forward in the horizontal direction to the position corresponding to the upper bracket 27. Thereafter, the entire workpiece replacement arm 17 moves down to insert the falling prevention pins 6a in the pin holes 7d, and further engages the positioning projections 7e with the positioning holes 6c. Thus, the shelf 6-6 is mounted on the upper bracket 27, and the arm body 17a moves back in the horizontal direction to its original position (see FIG. 17).

In this embodiment, because the shelves of the workpiece storage unit 2 are constituted of the fixed shelves 6-1, 6-3, . . . , 6-9 and the removable shelves 6-2, 6-4, . . . , 6-10 and the removable shelves are moved in an upward or downward direction, the size of each housing space can be changed, and workpieces of different sizes can be housed in the same workpiece storage unit, thereby allowing to increase types of workpieces which can be housed.

Further, because the workpiece replacement device 5 for replacing an unprocessed workpiece 4b housed in a housing space with a processed workpiece 4a is used for moving the shelves to change the housing space, the housing spaces can be changed without providing a new housing space changing mechanism and thus without complicating the structure of the entire machine.

Further, because it is structured to enlarge the housing space by moving the removed shelf to the upper bracket 27 arranged above this shelf, it is not necessary to secure a housing space for a removed shelf separately, and it is possible to change the housing space in a short time.

Because the workpiece detecting sensor 25 detecting the size of the workpiece 4 is disposed on the preparation station 8, and the workpiece 4 is automatically housed by the workpiece replacement arm 17 in the housing space corresponding to the size of the workpiece detected by the workpiece detecting sensor 25, it is not necessary for the operator to perform operation to specify the workpiece size with an operation board, thereby facilitating a workpiece supply operation and further preventing human errors such as errors in workpiece size.

It should be noted that although the case where the housing space is enlarged by moving the shelf upward has been described in this embodiment, it is also possible to reduce a housing space by adding a shelf. In this way, the number of housing spaces can be increased.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The text of Japanese priority application No. 2009-136133 filed on Jun. 5, 2009, is hereby incorporated by reference.

What is claimed is:

1. A machine tool, comprising:
   a workpiece storage unit having a plurality of housing spaces housing workpieces; and
   a processing machine processing a workpiece supplied from one of the housing spaces,
   wherein the workpiece storage unit is structured so that the size of each housing space is changeable, and
   wherein the workpiece storage unit has a workpiece replacement device supplying a workpiece housed in one of the housing spaces to the processing machine and housing a workpiece processed with the processing machine in one of the housing spaces, and the size of each housing space is changed using the workpiece replacement device.

2. The machine tool according to claim 1,
   wherein the workpiece storage unit has a plurality of support posts extending in a vertical direction and shelves disposed at plural levels on the support posts, at least a part of the shelves is removable, and the size of each housing space is changed by the workpiece replacement device attaching/removing the removable shelves to/from the support posts or moving the attaching position thereof in an upward or downward direction.

3. The machine tool according to claim 2, further comprising
   a workpiece detecting device for detecting the size of a workpiece which is supplied to the workpiece storage unit,
   wherein the workpiece replacement device houses the supplied workpiece in a housing space having a size corresponding to the size of the workpiece detected by the workpiece detecting device.

* * * * *